United States Patent Office 3,428,270
Patented Feb. 18, 1969

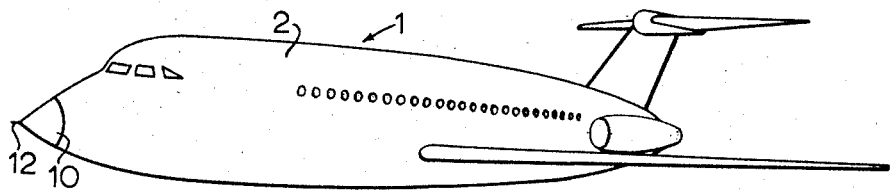
FIG.1
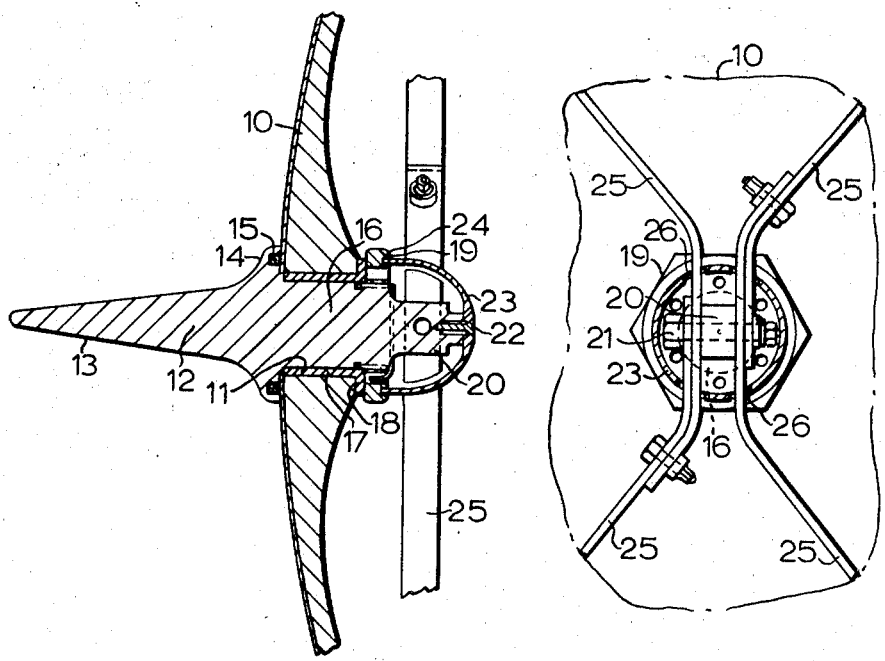
FIG. 4
FIG. 5
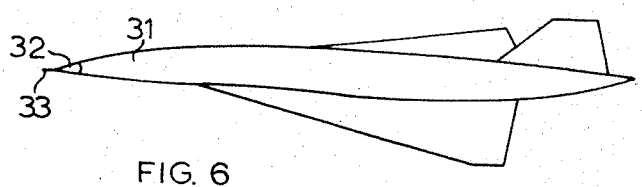
FIG. 6

3,428,270
LIGHTNING CONDUCTORS IN AIRCRAFT
John R. Knight, Byfleet, Surrey, and John Leworthy, Bristol, England, assignors to British Aircraft Corporation (Operating) Limited, London, England, a British company
Filed June 13, 1966, Ser. No. 557,243
Claims priority, application Great Britain, June 17, 1965, 25,700/65
U.S. Cl. 244—1    6 Claims
Int. Cl. B64d 45/02; G01c 21/00

ABSTRACT OF THE DISCLOSURE

A lightning conductor for a non-metallic section of an aircraft fuselage such as a radome. The lightning conductor includes a metal spike projecting through the apex of the non-metallic section of the fuselage and metal conductors are connected to the spike and extend back to the base of the non-metallic section following generally, the internal contour of the radome. At the base of the non-metallic section, conductors are connected to the main metal part of the fuselage. The conductors may take the form of strips extending in planes, radial to the axis of the non-metallic section. Alternatively, where the spike is in the form of a Pitot tube, the conductors may be tubes which connect the Pitot tubes to an aircraft speed indicator as well as to the metal part of the fuselage.

---

Figure 3:
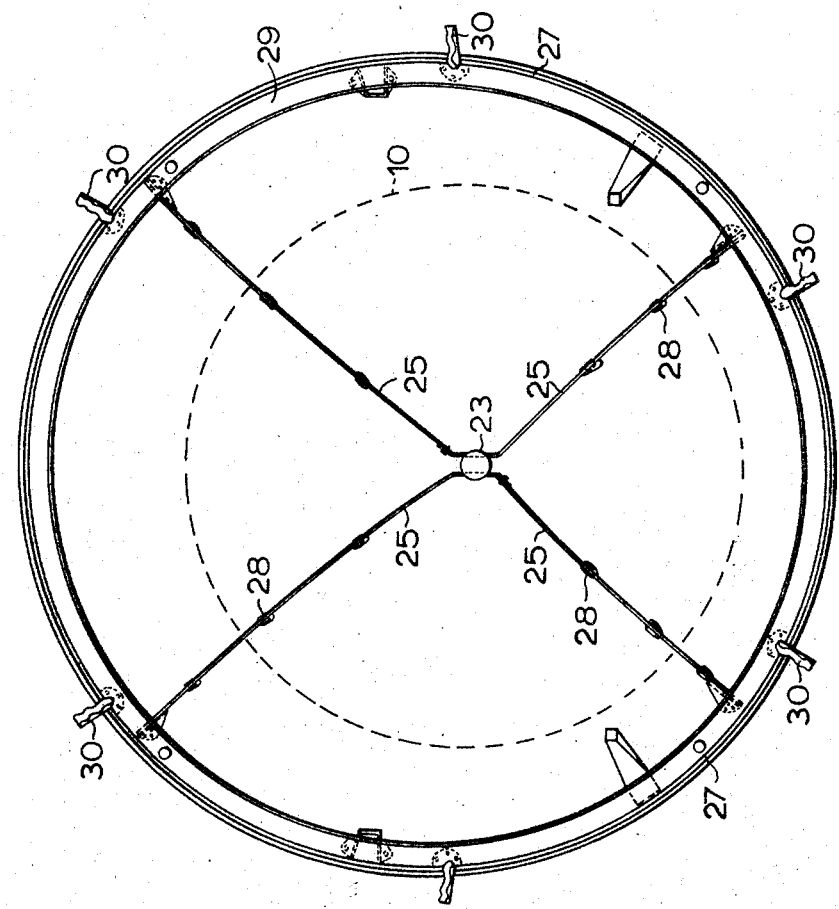

This invention relates to lightning conductors for aircraft, and more specifically to lightning conductors for non-metallic sections of aircraft fuselages, such as radomes. A radome, which contains the aircraft's radar and other directional equipment, usually forms the nose section of the fuselage, and it has been found that a large proportion of lightning strikes on aircraft occur on the nose section. Such a strike is liable to cause serious damage to the radome or other non-metallic section unless the lightning discharge is rapidly conducted to the adjacent metal parts of the fuselage.

It has been proposed in patent specification No. 902,268 to apply a number of adhesive-backed metallic tapes to the exterior of a plastic section of an aircraft fuselage, to act as lightning conductors. The tapes are ionized and disintegrated by a lightning strike, so that after a strike the aircraft is more or less deprived of protection until the tapes have been replaced. Further, trouble has been experienced in practice with tapes becoming partly detached, the movement of loose tapes in the slipstream seriously interfering with the operation of the aircraft's radio equipment.

The present invention approaches the problem from a different angle, by accepting that a certain number of lightning strikes is inevitable and by recognising that it is better to provide a relatively permanent low-resistance path which will attract the majority of such strikes. diverting them from locations where they might cause damage, and conducting the discharge safely into the main fuselage structure. It has previously been assumed that the presence in a radome of metal conductors of a size adequate to conduct a lightning discharge would cause inacceptable interference with the operation of the radio or radar equipment. The present invention, however, provides a construction by means of which such interference can be reduced to an acceptably low level while still providing protection against lightning strikes.

According to the present invention, a lightning conductor for a non-metallic section of an aircraft fuselage which projects from the main fuselage contour, comprises a metal spike adapted to project through the apex of the projecting section, at least one metal conductor connected to said spike and shaped to follow the internal contour of the projecting section from its apex to its base, and means for connecting said conductor to a metal part of the fuselage adjacent said base.

Preferably, a number of the conductors are provided in the form of strips lying in planes substantially radial to the axis of the spike and of the radome, so as to present a minimum surface area towards radar or other equipment mounted in the radome.

The ends of the conductors at the base of the radome may be adapted to be connected to the adjacent metal parts of the fuselage through spring-loaded clips, so that the radome and the lightning conductor form a single replaceable unit.

Figure 2:
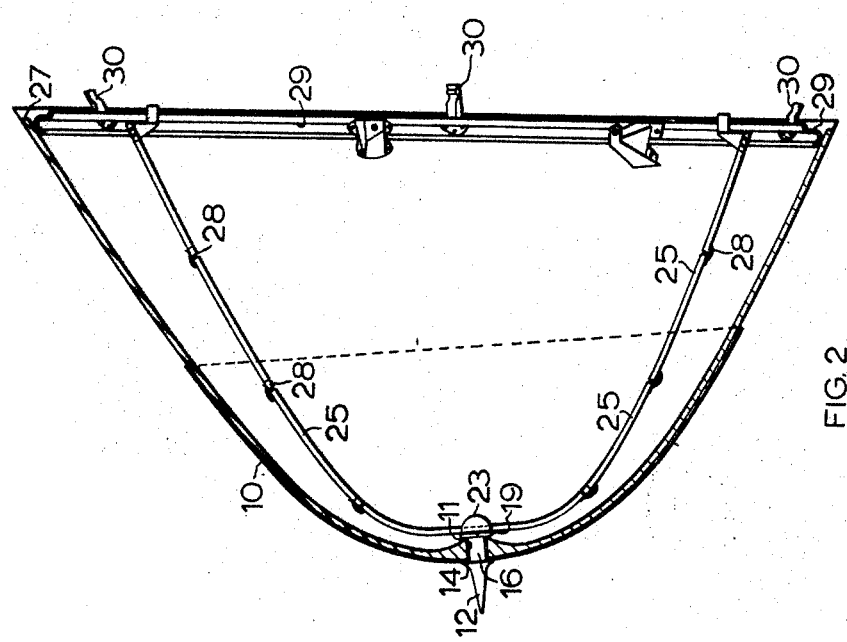
Figure 7:
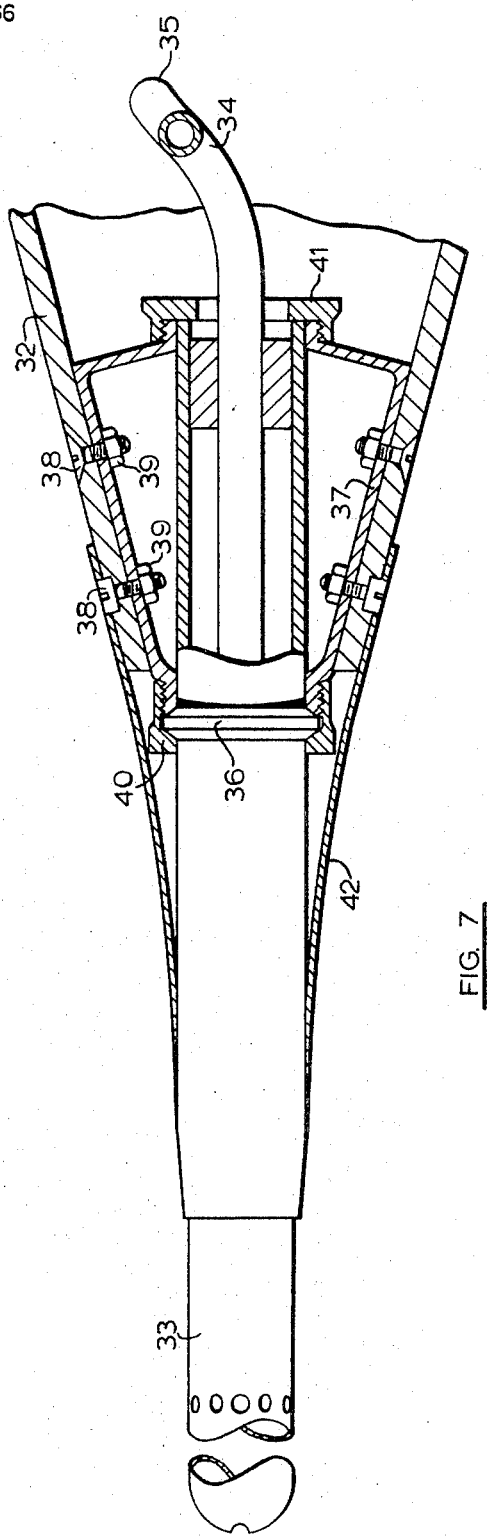

Two embodiments of the invention will now be described in more detail by way of example and with reference to the accompanying drawings, in which:

FIG. 1 is a perspective view of an aircraft,

FIG. 2 is a section through the radome of the aircraft shown in FIG. 1, which incorporates a lightning conductor in accordance with the invention, FIG. 3 is a rear view of the radome, FIG. 4 is an enlarged section through the spike and its fixing, FIG. 5 is a view from the right-hand side of FIG. 4 with the domed cover removed, FIG. 6 is a perspective view to a smaller scale than FIG. 1 of another aircraft, and FIG. 7 is a sectional view similar to FIG. 4 through the radome of the aircraft of FIG. 6.

FIG. 1 illustrates a subsonic transport aircraft 1 having a fuselage 2 and a radome in the form of a replaceable dome-shaped fuselage nose section 10. The radome 10 is moulded from a plastic material such as resin-bonded glass fibre, with an axial bore 11 (FIGS. 2 and 4) through its apex. A metal spike 12, e.g., of aluminium alloy, is fitted into the bore 11 so as to project forwardly from the radome, thus forming the foremost part of the aircraft. The spike 12 has a tapered outer section 13 flaring rearwardly into a collar 14 accommodating a rain seal 15 (FIG. 3) on the outside of the radome, and a cylindrical shank 16 fitting closely in a bush 17 in the bore 11 in the radome. The inner end of the bush 17 has an out-turned flange 18 and the inner end of the shank 16 is screw-threaded to receive a nut 19 bearing against the flange 18 to secure the spike 12. A flat-sided lug 20 projects axially from the inner end of the shank 16, and is drilled transversely to receive a bolt 21 (FIG. 5) and axially to receive a screw 22 holding a domed cover 23, the periphery of which fits in a groove 24 in the nut 19 on the end of the shank.

The bolt 21 also passes through holes in the ends of four flat conducting strips 25 and thereby connects them ot the spike 12. The ends of the strips 25 are disposed in overlapping relationship, two on each side of the lug 20, as best seen in FIG. 5. From this point, the strips 25 pass through slots 26 in the domed cover 23 and are then bent so as to extend along the inside surface of the radome 10, following its contour from its apex to its base 27. At intervals along the lengths of the strips, they are supported in channelled brackets schematically indicated at 28 secured to the inner surface of the radome 10. The strips 25 are disposed at right angles to the adjacent inner surface of the radome and thus lie in planes substantially radial to the axis of the spike 12 and the radome 10. These planes are preferably disposed at right-angles to one another, at 45° above and below the horizontal on either side of the vertical longitudinal plane, as shown in FIGS. 3 and 5. This disposition of the strips 25 causes a minimum of interference with the operation of the radar equipment in the radome.

The ends of the strips 25 at the base 27 of the radome are connected to a metal earthing ring 29 which extends round the inner periphery of the base 27 and which is provided with spring-loaded clips 30 for making electrical connections to adjacent metal parts of the fuselage 2. The radome 10 is attached to the fuselage 2 in conventional manner so that it can be removed as a whole, with the lightning conductor formed by the spike 12, conducting strips 25 and earthing ring 29.

Instead of using spring clips, the earthing ring 29 may be bolted or welded to the adjacent metal parts of the fuselage and the strips 25 made self-supporting. In that case, on removal of the radome 10, the strips 25 are detached from the spike 12 and remain attached to the fuselage.

FIGS. 6 and 7 illustrate a second embodiment of the invention, for use with a supersonic transport aircraft which has a fuselage 31 whose nose section is sharply tapered to a point and is constituted as before by a radome 32 of a plastic material. In this case, the spike 33 is in the form of a conventional Pitot tube (see FIG. 7) and the pipes 34, 35 conveying the Pitot and static pressure back from it to the conventional air speed indicator (not shown) form the conductors for lightning discharges. The Pitot tube 33 has a collar 36 which is located against the end of a conical supporting member 37 which in turn is secured in the apex of the radome 32 by bolts 38 and nuts 39. The Pitot tube 33 is secured in position by locking rings 40, 41 screw-threaded on to the conical member 37. A fairing 42 provides a smooth transition from the surface of the Pitot tube 33 to that of the radome 32.

The lightning conductors according to the invention can provide effective protection for a radome against lightning strikes of an intensity at least equal to that which British Civil Airworthiness Requirements lay down should be taken into consideration. Its effectiveness is not destroyed by such a strike and it causes a minimum of interference with the radar and other equipment in the radome.

What we claim as our invention and desire to secure by Letters Patent is:

1. A lightning conductor for an aircraft fuselage having a main metal part and a non-metallic radome, the radome having a apex remote from said metal part and a base lying adjacent said metal part, said conductor comprising a metal spike projecting through said apex, a plurality of metal strips connected to said spike and lying in planes substantially radial to the longitudinal axis of the spike and of the radome and shaped to generally follow the internal contour of said radome from said apex to said base, and means for connecting said conductor to said metal part of the fuselage.

2. The construction according to claim 1, wherein said strips are disposed substantially at right-angles to one another and each are approximately at 45° above and below the horizontal on either side of the vertical longitudinal plane.

3. The construction according to claim 1, wherein the means for connecting said strips to said metal part of the fuselage include spring-loaded clips.

4. The construction according to claim 3, wherein the ends of the strips at the base of the radome are connected to a grounding ring which extends at least substantially around the inner periphery of the base and carries said spring-loaded clips.

5. The construction according to claim 1, wherein the said strips are detachably connected to said spike.

6. The construction according to claim 5, wherein said spike has a tapered portion for projecting outwardly from the radome, a rain seal in the base of said tapered portion, said spike being provided with a reduced cylindrical shank which fits in a bore in the apex of said radome, and a lug on said shank and projecting inwardly therefrom to which said strips are connected.

References Cited
UNITED STATES PATENTS

| | | | |
|---|---|---|---|
| 2,333,144 | 11/1943 | Bennett et al. | 174—2 |
| 2,982,494 | 5/1961 | Amason | 174—2 |
| 3,009,982 | 11/1961 | Newman | 340—27 XR |
| 3,081,051 | 3/1963 | Robinson | 73—182 |

LOUIS R. PRINCE, *Primary Examiner.*

DONALD O. WOODIEL, *Assistant Examiner.*

U.S. Cl. X.R.

73—212